United States Patent [19]
Henricksen

[11] 3,828,931
[45] Aug. 13, 1974

[54] SUBMERGED LITTER COLLECTOR

[76] Inventor: Evan R. Henricksen, 245 W. Las Flores, Arcadia, Calif. 91006

[22] Filed: Dec. 21, 1972

[21] Appl. No.: 317,102

Related U.S. Application Data

[63] Continuation-in-part of Ser. No. 198,712, Nov. 15, 1971, abandoned.

[52] U.S. Cl.............. 210/163, 210/169, 210/244, 210/473
[51] Int. Cl............................ E03f 5/06, B01d 35/28
[58] Field of Search .......... 210/163, 169, 172, 460, 210/244, 237, 473; 4/172, 173, 293

[56] References Cited
UNITED STATES PATENTS

| | | |
|---|---|---|
| 249,001 | 11/1881 | Carpenter .............................. 4/293 |
| 627,016 | 6/1899 | Schultheiss ............................ 4/293 |
| 1,379,501 | 5/1921 | Wilson .................................... 4/293 |
| 1,494,882 | 5/1924 | Barger .................................... 4/292 |
| 3,321,080 | 5/1967 | Pansini et al. ...................... 210/163 |
| 3,402,407 | 9/1968 | Andrews ................................ 4/293 |
| 3,667,611 | 6/1972 | Pansini ............................ 210/163 X |

*Primary Examiner*—Theodore A. Granger
*Attorney, Agent, or Firm*—Sellers and Brace

[57] ABSTRACT

A litter collector for the outlets of swimming pools and the like liquid containers, the trap being formed of non-corrosive material and having a movably supported buoyant cover open while the trap is submerged but which closes automatically while being lifted thereby to trap collected litter. The cover is held in an extended open position when submerged and closes by gravity when not submerged.

17 Claims, 4 Drawing Figures

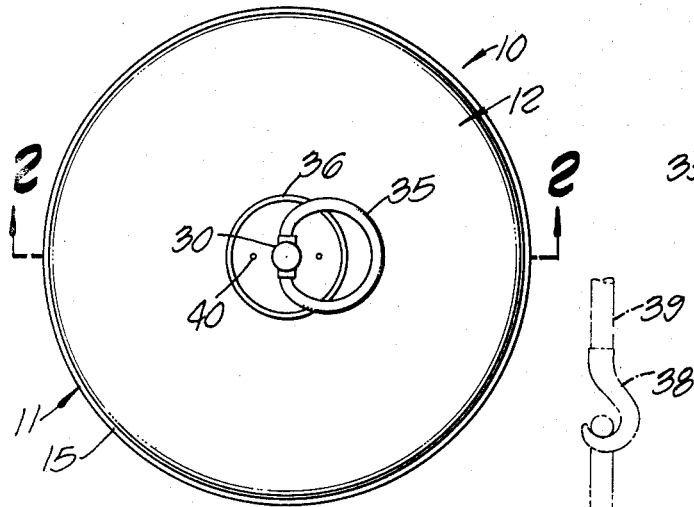
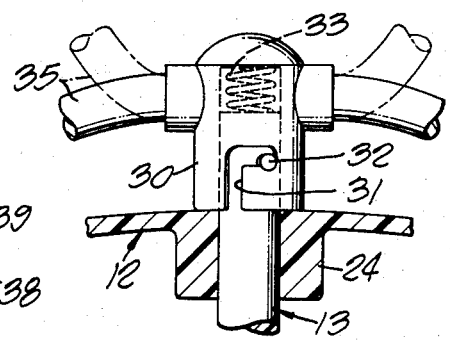
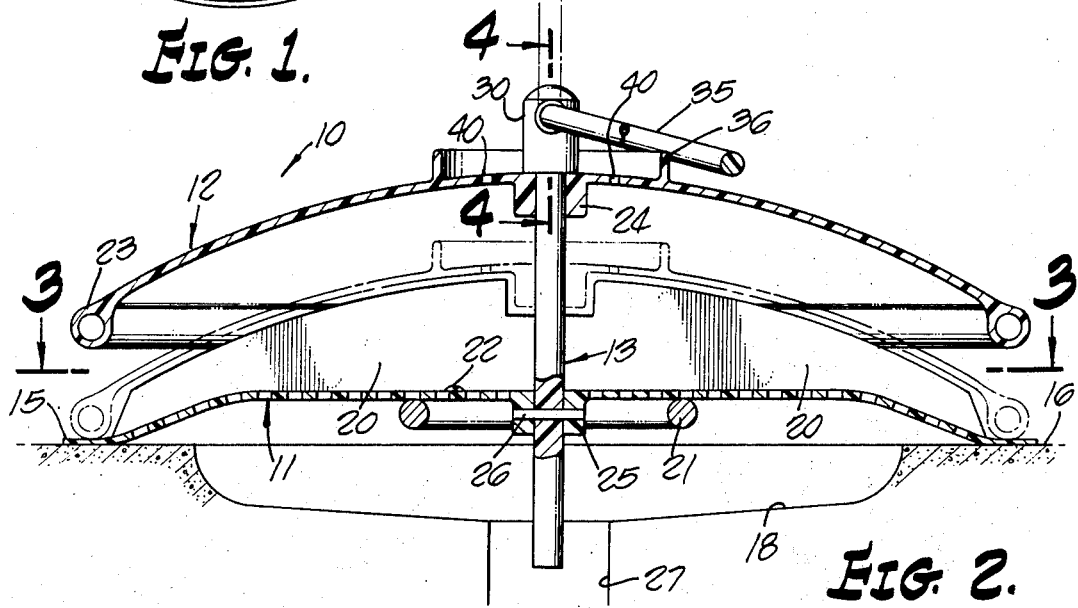
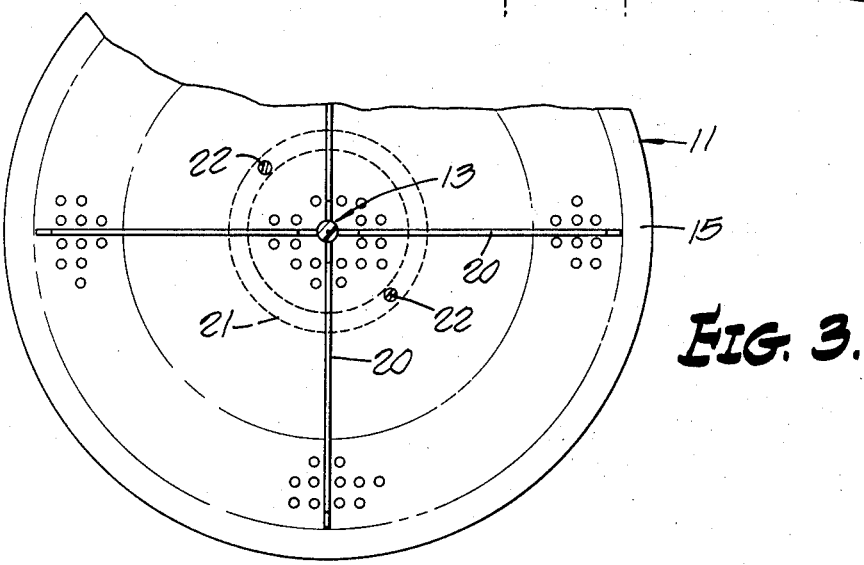

SUBMERGED LITTER COLLECTOR

This application is a continuation-in-part of my co-pending application for U.S. Pat. Ser. No. 198.712, filed Nov. 15, 1971 entitled SUBMERGED LITTER TRAP now abandoned.

This invention relates to litter collecting devices, and more particularly to a specially designed collector for use over a submerged drain and having a buoyant cover which opens automatically so long as the collector is submerged and which closes as the collector is lifted and remains closed by gravity when not submerged.

Swimming pools, storage tanks and other open liquid containers are subject to the problem of preventing litter, debris and other material falling into the liquid from entering the drain at the bottom of the container and fouling filters, pumps and other equipment downstream from the container. Proposals have been made heretofore for covering the drain with screening or the like but this necessitates the hand removal of collected litter from time to time to free the drain for unobstructed flow. Proposals have been made for covering the drain with a removable debris collector but the devices heretofore provided for this purpose are subject to certain shortcomings and disadvantages avoided by the present invention. Thus, it has been proposed to place a bowl-like collector over the outlet having a perforated bottom but such collectors are subject to the serious disadvantage that the raised rim of such collectors provide barriers against the entry of certain litter on or close to the bottom of the container and such litter remains trapped in an area outside the collector with the result that other means must be employed for removing this litter. If the collector were not present then liquid entering the drain would flow along the bottom of the container and carry the debris to the drain; with the collector in place the flow into the drain occurs above the bottom and does not move the litter to the drain.

The foregoing and other shortcomings of prior litter collectors are avoided by the present invention. In an exemplary embodiment of the invention, the litter collecting device comprises a reticulated bottom disk sufficiently large to embrace the outer peripheries of the drain. Movably attached to the perimeter of this bottom disk is a dome-shaped buoyant cover which cooperates with the bottom to provide a litter trap when in a closed position but, when open, leaves the sides of the trap freely open to liquid flow. In consequence the cover opens automatically as the collector is lowered over the drain and closes in response to lifting the collector to withdraw it from the liquid thereby trapping any collected litter and preventing it from escaping as the collector is being withdrawn for servicing.

It is therefore a primary object of the present invention to provide a simple, inexpensive litter collector for use over submerged drains.

Another object of the invention is the provision of a litter collector for use over tanks, drains and outlet openings and having a buoyant cover which opens automatically and remains open so long as the collector is submerged.

Another object of the invention is the provision of a litter collector for use over a swimming pool drain and having a cover which opens automatically when submerged and which responds to removal of the collector from an installed position to close and trap the litter therewithin.

Another object of the invention is the provision of a litter collector for use over a drain for a tank and which closes automatically as it is being removed from an installed position to trap litter and retain the same trapped until deliberately opened.

These and other more specific objects will appear upon reading the following specification and claims and upon considering in connection therewith the attached drawing to which they relate.

Referring now to the drawing in which a preferred embodiment of the invention is illustrated:

FIG. 1 is a top plan view of a preferred embodiment of the invention;

FIG. 2 is a cross-sectional view on an enlarged scale taken along line 2—2 on FIG. 1 and showing the collector in place over a drain;

FIG. 3 is a fragmentary sectional view on a reduced scale taken along line 3—3 on FIG. 2; and FIG. 4 is a fragmentary view on an enlarged scale taken along line 4—4 on FIG. 2.

Referring initially more particularly to FIG. 2, there is shown a typical embodiment of the invention litter collector designated generally 10. The principal components of the collector include a perforated bottom disc 11 and a buoyant cover 12 held movably assembled by post 13 here shown as extending centrally therebetween. All components are preferably made from non-metallic non-corrosive material such as polypropylene, polyvinyl chloride or any of many other suitable plastic compositions. Bottom disc 11 is perforated throughout all portions with the exception of the thin rim portion 15 which seats firmly against the bottom of a swimming pool or other containers 16 in an area surrounding the rim of a drain outlet 18.

Secured to or molded integral with bottom 11 are a plurality of upright ribs or partitions 20, 20 which radiate from the center and cooperate with one another in preventing litter entering the collector from being flushed or washed out of the collector. Except for the ribs 20, water whips and other flushing devices commonly used to flush the bottom of swimming pools and the like could sweep collected litter out of the collector. The ribs also serve to reinforce the bottom and the upright post 13 interconnecting the bottom and its cover 12.

Suitable means are attached to bottom 11 to hold it firmly submerged over drain 18, as for example, a lead weight or ring 21 held in place by fasteners 22. Weight 21 may be molded into the bottom.

Cover 12 is preferably a shallow dome shaped member having a bulbous hollow rim 23 sized to render the cover slightly buoyant when submerged. The hollow rim also reinforces the cover and is arranged and shaped to seat against the rim portion 15 of bottom 11 to trap litter within the collector. As here shown, the upper end of post 13 has a loose sliding fit with hub 24 of the cover. However, it will be understood that the post may be fixed to the cover and have a loose sliding fit with hub 25 centrally of bottom 11. As here shown, post 13 is held fixed to hub 25 by an assembly pin 26. In either event, post 13 projects downwardly below hub 25 and into drain pipe 27. Accordingly, the lower end of the post cooperates with the drain pipe in preventing lateral displacement of the collector from its desired assembled position over the drain.

Cover 12 may be held detachably assembled to post 13 by a tubular cap 30 having a bayonet connection 31, 32 with the post, the details being best shown in FIG. 4. The bayonet connection is held in assembled position by a compression spring 33 having one end bonded to the bottom of the well in cap 30 and its lower end pressed against the upper end of post 13. Loosely journaled in cap 30 is a ring 35 which normally occupies a position of rest against an annular rib projecting upwardly from the central portion of cover 12. This facilitates engagement of ring 35 by a hook 38 attached to the end of a long pole 39 and manipulatable by the operator while standing on the edge of a swimming pool to install the collector over the drain or to remove it therefrom for servicing. It is also pointed out that cover 12 is provided with one or more venting ports 40 to permit passage of water through the cover during lowering and raising of the collector.

The operation of the described litter collector will be quite apparent from the foregoing detailed description of its construction. Normally and before installation in its submerged position over a drain, cover 12 will be freely movable toward and away from bottom 11 and, unless the collector is resting on a flat surface, cover 12 will normally gravitate into the dotted line position shown in FIG. 2. The installation of the collector is preferably carried out using a long pole 39 with a hook 38 on its end. This hook is engaged with ring 35 and the collector 10 is lowered into the water until post 13 enters the drain pipe 27. The operator then knows that the collector is properly centered over the drain and that the rim edge 15 of bottom 11 is resting flush against the bottom of the pool. During the lowering operation water entering beneath cover 12 can escape past the rim edge as well as through ports 40. As soon as the cover enters the water its buoyancy causes it to rise along post 13 until stopped by end cap 30. As the pole 39 is disengaged from ring 35 the collector is in its fully operative position with the cover spaced sufficiently above the bottom to permit free flow of water beneath the rim of the cover along with any litter and foreign matter carried by the water. Fines will pass through the perforations in bottom 11 along with water flowing through the drain and to the filter normally used in connection with swimming pool drain outlets. Any matter, including leaves and other trash, not passing through the perforations remains trapped in the collector.

When the collector is in need of servicing for any reason the operator simply engages hook 38 of pole 39 beneath ring 35 and lifts the collector upwardly through the water. The slightest upward lifting movement applied to the collector causes the overlying water to close cover 12 until its rim seats firmly against rim portion 15 of bottom 11. This condition is maintained throughout the lifting operation and continues until such time as the cover is deliberately lifted away from the bottom thereby permitting the collected litter to be removed.

While the particular submerged litter collector herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A litter collector for use over the entrance to a submerged drain comprising: a main body having a reticulated bottom adapted to rest by gravity over a submerged drain to collect litter from liquid passing to the drain, and buoyant cover means having a rim sized to seat against a juxtaposed rim of said main body, and including means for holding the same captively and movably supported and buoyantly spaced above said reticulated bottom so long as said litter collector is submerged and whereby said rim which seats automatically against the juxtaposed rim portion of said reticulated bottom while said collector is being elevated away from a submerged drain traps and retains litter captive until ready for removal therefrom.

2. A collector as defined in claim 1 characterized in that said bottom and cover means therefor and formed substantially of non-metallic material.

3. A collector as defined in claim 1 characterized in that said bottom includes a plurality of upright intersecting ribs subdividing said bottom.

4. A collector as defined in claim 1 characterized in that said bottom includes upright ribs radiating from the center thereof and cooperating to trap litter.

5. A collector as defined in claim 1 characterized in that the rim portion of said bottom is thin and adapted to rest flush against the bottom of a liquid container surrounding the entrance to a drain.

6. A collector as defined in claim 1 characterized in that said cover means and said bottom include means holding the same movably assembled to one another for limited movement toward and away from one another.

7. A collector as dfeined in claim 1 characterized in that said cover means is dome-shaped with its rim normally buoyantly supported sufficiently above the juxtaposed rim portion of said bottom to admit liquid-borne litter passing toward a submerged drain over the entrance of which said collector is adapted to be installed.

8. A collector as defined in claim 1 characterized in that said cover means and said bottom include readily disconnectable means normally holding the same detachably assembled.

9. A collector as defined in claim 1 characterized in the provision of elongated rod means fixed normal to one of said bottom and said cover means and having limited movement through the other one thereof.

10. A collector as defined in claim 1 characterized in that said buoyant cover means is ported to permit passage of liquid therethrough.

11. A collector as defined in claim 1 characterized in the provision of means on said collector engageable by lifting tool means while being lowered over and removed from a drain.

12. A collector as defined in claim 1 characterized in that said bottom includes weight means effective to hold said collector in place over a drain.

13. A collector as defined in claim 1 characterized in the provision of means projecting downwardly from the underside of said bottom adapted to engage a drain to restrain said collector from lateral movement relative to a drain over which the collector is installed.

14. A collector as defined in claim 1 characterized in that said buoyant cover means is dome-shaped and includes a hollow rim effective to render said cover means buoyant.

15. A litter collector for use over the entrance to a submerged drain which comprises wide area perforated means seatable loosely over the drain and effective to separate trash and litter from water entering the drain, and buoyant dome means normally spaced axially above said perforated means having the rim thereof generally coextensive in size with the rim portion of said perforated means and movable automatically to a position seating against the rim portion of said perforated means and cooperating therewith to trap collected litter as said litter collector is being lifted away from a submerged drain for servicing.

16. A litter collector as defined in claim 15 characterized in that said means for trapping litter on said perforated means is buoyant and includes stop means for limiting the upward buoyant movement thereof while installed over a drain.

17. A litter collector as defined in claim 15 characterized in that the rim of said means for trapping litter on said perforated means is urged closed by gravity action against the juxtaposed peripheral portion of said perforated means so long as said collector is not submerged and so long as said litter collector is being lifted upwardly through the water from its normal submerged operating position.

* * * * *